March 15, 1966 L. E. ÖHLIN 3,240,110
APPARATUS FOR DETERMINING THE LOSSES OF BLOOD
IN SURGICAL OPERATIONS AND DELIVERIES
Filed Oct. 26, 1962 2 Sheets-Sheet 2

United States Patent Office 3,240,110
Patented Mar. 15, 1966

3,240,110
APPARATUS FOR DETERMINING THE LOSSES OF BLOOD IN SURGICAL OPERATIONS AND DELIVERIES
Lars Erik Öhlin, Solna, Sweden, assignor to Ab Lars Ljungberg & Co., Stockholm, Sweden, a corporation of Sweden
Filed Oct. 26, 1962, Ser. No. 233,368
Claims priority, application Sweden, Nov. 30, 1961, 11,940/61
3 Claims. (Cl. 88—14)

The invention relates to means for determining the losses of blood in surgical operations and deliveries.

In surgical operations and deliveries it is often necessary to compensate, at least partly, the patient for the losses of blood sustained by a transfusion of blood. Of course, it would be highly desirable to replace the lost amount of blood completely, but this has hitherto been impossible to carry out for the reason that accurate statements of the losses of blood have been lacking.

In a known method for determining such losses, the blood, possibly collected by means of absorbing material, is suspended in a measured amount of a diluting liquid in a vessel, whereupon the electric conductivity of the suspension thus obtained is determined by two electrodes inserted in the vessel. A calculation of the amount of blood based on an increase of this conductivity will, however, be quite misleading, as it cannot be avoided that also other highly conductive liquids such as animal fluids other than blood and salt solutions used for washing, are incorporated in the suspension.

The invention has for its purpose to provide improved means making possible a determination of the total loss of blood or hemoglobin with a quite sufficient accuracy. In the same way as before, the apparatus comprises a vessel provided with an agitator and adapted to contain a measured amount of a liquid in which the blood, possibly collected by means of absorbing material, is to be diluted, and the invention is characterized in that a pump, at least one valve, and the analyzing cell of an electric photometer are inserted in a liquid circulation pipe system connected to the vessel to make possible an examination of the diluted blood with regard to its colour of hemoglobin, the values thus found being used for a calculation of the total amount of blood or hemoglobin in the vessel.

If the amount of hemoglobin only is of interest, it may be sufficient to carry out for good a comparative test with a diluted suspension or solution of blood of a known hemoglobin content, whereupon the value found on analysis is put in relation to the photometric value of said comparative test. In most cases, however, a statement of the quantity of blood is desired, and then it will be necessary to consider the blood value of the patient, i.e. the content of hemoglobin of this blood. This will be done by mixing a carefully measured, minor amount of the blood of the patient with an accurate amount of diluting liquid and then analyzing the mixture photometrically. Starting from the value thus found, it will then be easy to determine the amount of blood in the suspension or solution obtained by the soaking of the absorbing material.

The apparatus will be described more detailed in the following with reference to the accompanying drawings which show a preferred embodiment, where parts are broken away for the purpose of illustration.

Figure 1:
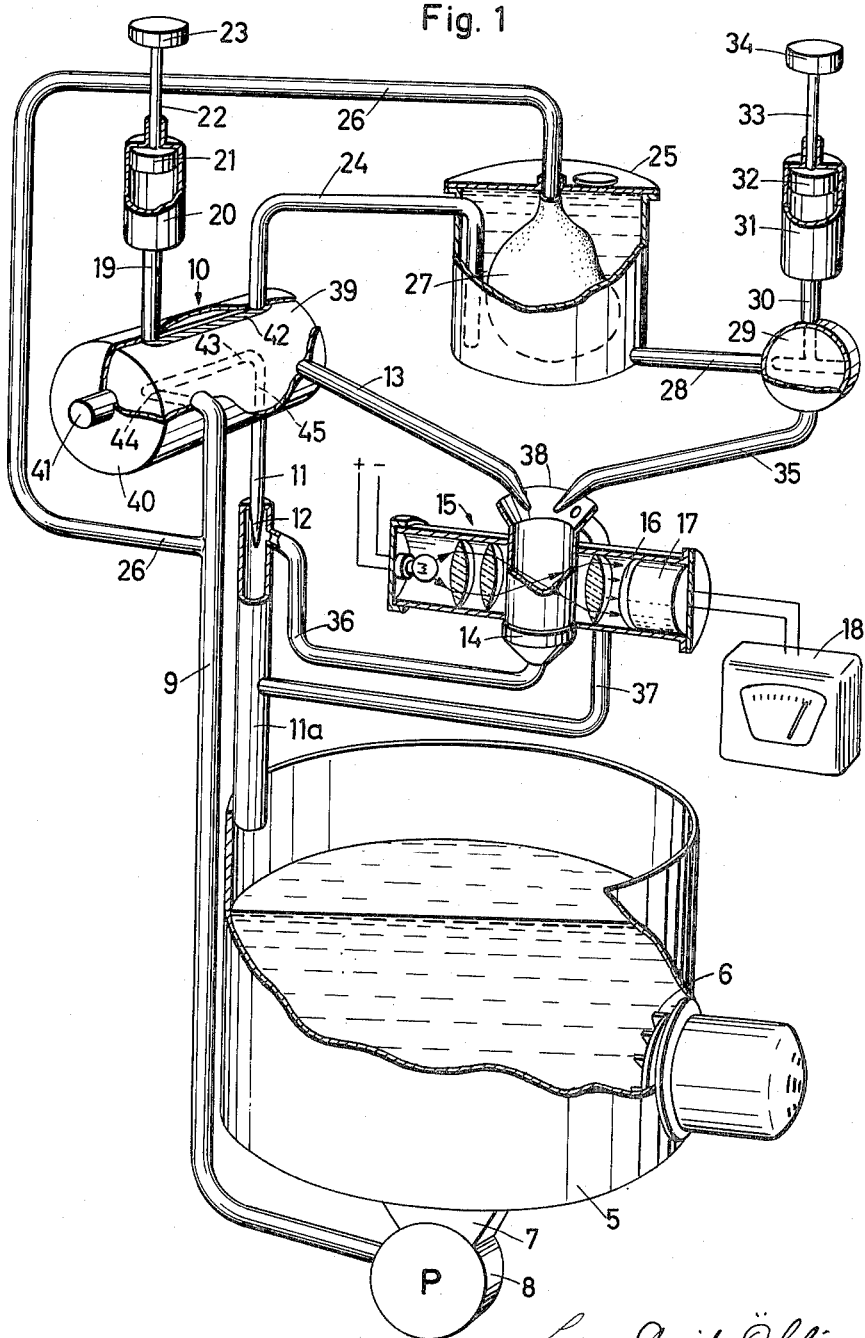
FIGURE 1 shows a perspective view of the whole apparatus.

In FIG. 1, 5 is a vessel provided with an agitator 6 driven by a motor. An outlet 7 at the bottom of the vessel is connected to motor-driven pump 8, and a conduit 9 extends from the pump to a multiple-way valve 10 further described hereinafter.

Four different pipes extend from the valve 10. One vertical pipe 11 is formed with an ejector nozzle 12 which ends in the top portion of a wider, vertical tube 11a, the lower end of which is inserted in the vessel 5. A second pipe 13 ends in the open, funnel-shaped end 38 of a translucent analytical cell 14 of a photometer 15 known per se. A coloured screen or light filter 16 may be mounted between the liquid cell 14 and the photoelectric cell 17 to compensate for the red colour of the liquid. The photoelectric cell is as common connected to a microampere meter 18.

A third pipe 19 connects the valve 10 to the bottom end of a vertical cylinder 20. A piston 21 in this cylinder has a rod 22 projecting upwards and provided with a push knob 23 on its free end. The fourth pipe 24, finally, connects the valve 10 to a closed container 25. A branch conduit 26 extending from the supply conduit 9 is liquid-tight fitted through the cap of the container 25, within which it is connected to a liquid-proof bladder 27 dimensioned to occupy, when wholly expanded, at least the major part of the volume of the container.

A conduit 28 extends from the container 25 to a two-way valve 29. Another pipe 30 connects said valve 29 to the bottom end of a vertical cylinder 31 containing piston 32 which may be made to slide with little friction only. The piston rod extending upwards carries a knob 34, the weight of which may be adapted to move the piston 32 downwards, when no overpressure is prevailing in the cylinder 31. Further, a pipe 35 extending from the two-way valve 29 ends in the top of the analyse cell 14. The valve 29 may consist of a plug cock with a T-shaped system of channels, as indicated by dotted lines in FIG. 1. In the position shown, the conduit 28 communicates with the cylinder 31, while the conduit 35 is closed. From this position the cock can be rotated clock-wise a quarter of a revolution only so that the cylinder 31 is instead connected to the outlet pipe 35, at the same time as the conduit 28 is closed.

A conduit 36 from the bottom of the analyse cell 14 ends in the return tube 11a a little above the orifice of the nozzle 12. Another conduit 37 also ending in the return tube 11a extends from the funnel-shaped portion 38 of the cell 14 to serve as overflow.

Figure 2:
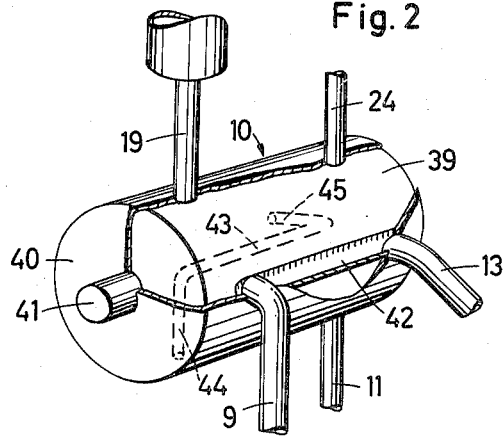
FIGURES 2 and 3 show the same valve as in FIG. 1, though in two different positions.

The valve 10 may be constructed differently and, if desired, it may be replaced by two separate valves, for instance. The embodiment shown has, however, been found especially suitable, as it combines a plurality of functions, while, at the same time, it is operable by a single turn of the hand. A cylindrical or possibly tapered plug 39 is rotatably journalled in a closely surrounding housing 40 through which the pipes 9, 11, 13, 19 and 24 are ending. The shaft 41 of the plug projecting from the housing may carry a knob or grip to be operated manually. An axial groove 42 provided in the envelope surface of the plug 39 terminates inside both ends of the plug. In the position shown in FIG. 1, this groove 42 connects the two pipes 19 and 24, and if the plug is rotated clockwise an angle of 90°, the groove will connect the pipes 9 and 13, as appears from FIG. 2. Another passage through the plug 39 is composed of two radial bores 44 and 45, which extend to the axis of the plug, and of an axial channel portion 43 which connects the inner ends of said bores 44, 45. In cross section, the angular distances between the center line of the groove 42 and the radial bores 44, 45 are 90° and 180° respectively, and thus the bores form together an angle of 90°. However, also other angles are possible, and as an example the angle between the radial bores may vary from about 60° to about 120°.

Figure 3:
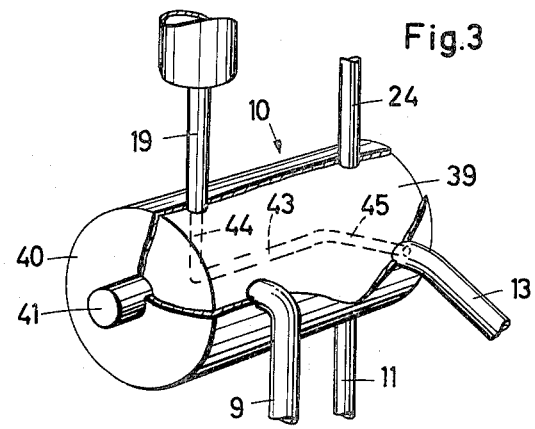

In the position shown in FIG. 1, the radial channel portion 44 is connected to the supply line 9 and the channel portion 45 communicates with the return pipe 11. In FIG. 3, the plug 39 has been rotated anti-clockwise an angle of 90°, so that said channel portions 44 and 45 are instead connected to the pipes 19 and 13 respectively. In this position the groove 42 is inoperative, and so is the case with the channel 43–45 in the angular position shown in FIG. 2.

In the operation of the apparatus described, the vessel 5 is charged with an accurately measured amount of a hemolyzing liquid (a weak solution of alkali), and also the container 25 is filled with liquid of the same kind. The bladder 27 is assumed to be collapsed entirely from the beginning. It may be noted that the vessel 5 is shown on a scale considerably smaller than that of the other details, and as an example the vessel may have a volume of about 100 litres, while the volume of the analyse cell 14 may be about 5 ml.

The agitator 6 and the pump 8 are now started, and clothes, compresses and gauzes soaked with blood as well as other blood-stained articles may then be successively put down in the vessel to the extent they are used. If the valve 10 is set in the position shown in FIG. 1, the liquid in the vessel 5 is circulated through the conduit 9, the channel 43–45 and the return conduit 11, 11a. Due to the ejector nozzle 12 a suction arises in the closed top of the tube 11a, whereby the liquid cell 14 may be emptied and sucked clean, if necessary.

The supply conduit 9 from the pump is given a considerably greater cross section area than the valve passage 43–45, whereby a relatively great overpressure arises in the conduit 9, and this overpressure will be transferred to the bladder 27 by means of liquid supplied through the conduit 26. Accordingly, also the liquid surrounding the bladder 27 in the container 25 is subjected to this overpressure, and in the positions of the valves 10 and 29 shown in FIG. 1, liquid is thus forced from the container 25 through the conduits 28 and 24, to fill the spaces below the pistons in the cylinders 31 and 20 respectively. By appropriate movements of the pistons 21, 32 all air is initially expelled from the conduits, such as the conduits 19 and 28.

To make possible an initial adjustment of the photometer 15 the valve 10 is at first rotated about 45° into an intermediate position in which its connections are all closed. The cock 29 is then rotated clockwise 90° from the position in FIG. 1, whereby the weight 34 depresses the piston 32 automatically so that liquid is supplied to the cell 14 through the pipe 35. The pointer of the microampere meter is now adjusted in zero position, as known per se, and the cock 29 is rotated back to its original position so that the cylinder 31 is refilled with liquid. It is obvious that liquid from the cylinder 31 can also be used for washing the cell 14 before a next examination.

Figure 4:
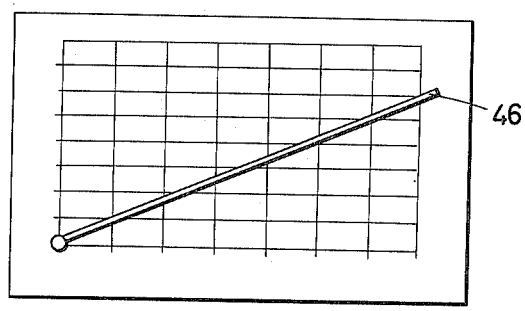
FIGURE 4 is a diagram useful for conversion of the reading into the corresponding amount of blood.

If a calculation of the total amount of blood is desired, the blood value of the patient has to be determined. For that purpose an exact amount of the blood is introduced in the pure liquid in the cell 14 by means of a micro pipette, whereupon the mixture is stirred with a glass rod. As an example the cylinder 31 may be dimensioned to supply 4 ml. liquid, while the added amount of blood may be 0.02 ml, i.e. a dilution of 1:200. The reading on the microampere meter 18 is used for calibration of the diagram shown in FIG. 4, where the microampere value is recorded at the ordinate, while the concentration of the blood is recorded at the abscissae. The point, where the vertical and horizontal lines intersect, is determined, and a ruler 46 pivotably journalled in origo is rotated such that it passes said point. Clamping means, not shown, may be provided to secure the ruler in its adjusted position.

The diluted blood used for the comparative test is removed from the cell 14 by turning the valve 10 back to the position in FIG. 1, whereby the ejector nozzle 12 sucks the liquid through the pipe 36. The liquid in the vessel 5 is now to be controlled, and for that purpose the valve 10 is rotated to the position in FIG. 2 so that liquid flows from the conduit 9 through the valve passage 43–45 and the pipe 13 into the cell 14. When desired, the liquid may be allowed to flow continuously through the cell 14 which is then kept filled up to the overflow outlet connected to the pipe 37, but the valve 10 may also be rotated into an inoperative position, when the cell 14 has been filled. The reading on the ampere meter is utilized for a determination of the concentration of blood of the liquid. Thus, on the diagram shown in FIG. 4, such concentration is represented by a vertical line passing through the point, where the ruler 46 intersects the horizontal line which corresponds to the reading. The diagram may be graded to indicate in ml the total amount of blood in the vessel 5.

When the concentration of the blood in the liquid has risen to about 1:80 the readings tend to be less accurate, so that a further dilution of the liquid may be necessary before the examination. In a first step the valve 10 is now adjusted in the position shown in FIG. 1 for removing the liquid from the cell 14, and then the valve 10 is rotated into the position shown in FIG. 3. In a next step the piston 21 of the cylinder 20 is depressed to replace the suspension present in the channel 43–45 and in the pipe 13 with pure liquid from said cylinder 20, and then the valve 10 is turned back to the position shown in FIG. 1, so that suspension from the vessel 5 refills the channel 43–45, while the pipe 13 remains filled with the diluting liquid. When now the valve 10 is again turned to the position shown in FIG. 3, and the piston 21 is depressed, the suspension enclosed in the channel 43–45 will be mixed in the cell 14 with diluting liquid contained in the pipe 13 and further supplied from the cylinder 20. The diluted suspension of blood thus obtained in the cell 14 is then tested.

The channel 43–45 may have a volume of 0.5 ml. for instance, and the cylinder 20 may be dimensioned such that the dilution will be exactly 1:10. Though not shown, the cylinder may also be designed to permit an adjustment of its volume. When the transparency of the diluted suspension has been determined, the valve 10 is rotated back to its position shown in FIG. 1, whereupon the apparatus is ready for withdrawing a next, diluted suspension.

It may be noted that an additional dilution of the suspension is necessary only at very great losses of blood. In most cases, the concentration of the blood in a reasonable amount of liquid in the vessel would remain within such a limit that the suspension or solution can be analyzed directly.

The method and apparatus described may be modified in several respects. For instance, it is not necessary to use the diagram shown in FIG. 4, as a calculation can be done also in some other way. If only the total amounts of hemoglobin in the vessel 5 is to be determined, the readings on the ampere meter would correspond directly to these values, as long as no additional dilution of the suspension is made.

What I claim is:

1. Apparatus for determining the losses of blood in surgical operations and deliveries, comprising a vessel having an outlet at the bottom containing a measured amount of diluent liquid in which the blood is to be diluted, an agitator in said vessel, a pump connected to said outlet, a multiway valve located outside said vessel, a conduit extending from said pump to said multiway valve, a return conduit from said valve to said vessel, an electric photometer having an analyzing cell located outside said vessel, a supply conduit from said valve to said analyzing cell, an outlet conduit extending from the bottom of said analyzing cell to control fluid flow from the analyzing cell, said multiway valve connecting in a first position said first named conduit to said return conduit to recirculate the liquid and in a second position connecting said first named conduit to said supply conduit to supply said analyzing cell.

2. An apparatus as set forth in claim 1 wherein there is provided a second vessel containing diluent liquid, a conduit connected to said second vessel and said multiway valve, a closed storage container containing diluent liquid, pressure operated means located in said container to provide pressure in said closed storage container, a branch conduit extending from said first named conduit to said pressure operated means, a further conduit extending from said storage container to said multiway valve in said first position connecting said conduit connected to said second vessel to said last named further conduit to permit transfer of diluent liquid from said storage container to said second vessel and said multiway valve having a third position connecting said conduit connected to said second vessel to said supply conduit to add diluent liquid to said analyzing cell.

3. An apparatus as claimed in claim 1, wherein said return conduit has an ejector nozzle serving as a liquid jet pump to return liquid to said vessel and said outlet conduit from the bottom of said cell is connected to said return conduit at the suction side of said ejector nozzle to control liquid flow from said analyzing cell.

References Cited by the Examiner

UNITED STATES PATENTS

| Re.23,653 | 5/1953 | Stern | 88—14 |
| 264,573 | 9/1882 | Seaburg | 137—625.41 |
| 2,051,317 | 8/1936 | Sheard | 88—14 |
| 2,295,366 | 9/1942 | Stout | 250—218 |
| 2,386,878 | 10/1945 | Nickerson | 88—14 |
| 2,621,557 | 12/1952 | Kavanagh | 88—14 |
| 2,724,304 | 11/1955 | Crawford | 250—218 |
| 2,797,149 | 6/1957 | Skeggs | 88—14 |
| 2,844,066 | 7/1958 | Friel | 88—14 |
| 2,980,142 | 4/1961 | Turak | 137—625.41 |
| 3,028,225 | 4/1962 | Sheen | 88—14 |
| 3,080,789 | 3/1963 | Rosin | 88—14 |

FOREIGN PATENTS 761,980 11/1956 Great Britain.

JEWELL H. PEDERSEN, *Primary Examiner.*